(12) United States Patent
Nakano et al.

(10) Patent No.: US 8,685,204 B2
(45) Date of Patent: Apr. 1, 2014

(54) METHOD FOR PEELING PRESSURE-SENSITIVE ADHESIVE OPTICAL FILM, AND PRESSURE-SENSITIVE ADHESIVE OPTICAL FILM

(75) Inventors: Fumiko Nakano, Ibaraki (JP); Yutaka Moroishi, Ibaraki (JP); Aimi Matsuura, Ibaraki (JP); Toshitsugu Hosokawa, Ibaraki (JP); Akiko Tanaka, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 482 days.

(21) Appl. No.: 12/864,047

(22) PCT Filed: Jan. 20, 2009

(86) PCT No.: PCT/JP2009/050773
§ 371 (c)(1),
(2), (4) Date: Jul. 22, 2010

(87) PCT Pub. No.: WO2009/093577
PCT Pub. Date: Jul. 30, 2009

(65) Prior Publication Data
US 2010/0304134 A1 Dec. 2, 2010

(30) Foreign Application Priority Data

Jan. 25, 2008 (JP) ................................. 2008-015079
Jan. 19, 2009 (JP) ................................. 2009-009115

(51) Int. Cl.
*B32B 38/10* (2006.01)

(52) U.S. Cl.
USPC ............ 156/706; 156/711; 156/752; 156/924

(58) Field of Classification Search
USPC .......................... 156/706, 711, 752, 756, 924
See application file for complete search history.

(56) References Cited

U.S. PATENT DOCUMENTS

| | | | |
|---|---|---|---|
| 6,451,156 B2 * | 9/2002 | Kishioka et al. | 156/329 |
| 2006/0144515 A1 * | 7/2006 | Tada et al. | 156/344 |
| 2007/0149715 A1 * | 6/2007 | Lee et al. | 525/329.5 |
| 2007/0166537 A1 * | 7/2007 | Nagamoto et al. | 428/355 AC |
| 2008/0023132 A1 * | 1/2008 | Sano et al. | 156/275.7 |
| 2008/0278672 A1 * | 11/2008 | Yano et al. | 349/193 |
| 2009/0311497 A1 * | 12/2009 | Aoki | 428/214 |
| 2009/0322994 A1 | 12/2009 | Satake et al. | |
| 2011/0008552 A1 * | 1/2011 | Umemoto et al. | 428/1.5 |

FOREIGN PATENT DOCUMENTS

| | | |
|---|---|---|
| CN | 1690152 A | 11/2005 |
| JP | 10-073795 | 3/1998 |
| JP | 10-168407 | 6/1998 |
| JP | 11-095210 | 4/1999 |
| JP | 2001-242448 | 9/2001 |
| JP | 2001-305502 | 10/2001 |
| JP | 2001-328849 | 11/2001 |
| JP | 2001-337305 | 12/2001 |
| JP | 2002-040259 | 2/2002 |
| JP | 2002-138260 | 5/2002 |
| JP | 2002-159955 | 6/2002 |
| JP | 2002258269 A * | 9/2002 |
| JP | 2002-350837 | 12/2002 |
| JP | 2005-148638 | 6/2005 |
| JP | 2005-224715 | 8/2005 |
| JP | 2005-247980 | 9/2005 |
| JP | 2005247980 A * | 9/2005 |
| JP | 2005-307034 | 11/2005 |
| JP | 2006-063178 | 3/2006 |
| JP | 2006-099018 | 4/2006 |
| JP | 2006-143858 | 6/2006 |
| JP | 2007-118486 | 5/2007 |
| JP | 2008-014988 | 1/2008 |

OTHER PUBLICATIONS

Second Office Action issued by the Chinese Intellectual Property Office in corresponding patent application No. 200980101343.4, dated Apr. 18, 2012.
International Search Report issued on the corresponding PCT Application No. PCT/JP2009/050773, dated Mar. 24, 2009.
Office Action dated Jul. 27, 2011 received in Chinese Patent Application No. 200980101343.4.
Notification of Reasons for Refusal dated Sep. 4, 2012 in corresponding Japanese patent application No. 2009-009115.

* cited by examiner

*Primary Examiner* — Mark A Osele
(74) *Attorney, Agent, or Firm* — Knobbe, Martens, Olson & Bear LLP

(57) ABSTRACT

An object of the invention is to provide a pressure-sensitive adhesive optical film-peeling method capable of easily detaching the pressure-sensitive adhesive optical film from a glass substrate with no damage to the glass substrate or no adhesive deposit on the glass substrate, and to provide a pressure-sensitive adhesive optical film suitable for use in such a peeling method. The invention is directed to a method for peeling a pressure-sensitive adhesive optical film from an optical film-carrying glass substrate including a glass substrate and the pressure-sensitive adhesive optical film bonded thereto, which includes: exposing the optical film-carrying glass substrate to an environment at a temperature of 40 to 98° C. and a relative humidity of 60 to 99% for three minutes or more; and then peeling the pressure-sensitive adhesive optical film from the glass substrate under the environment.

10 Claims, No Drawings

# METHOD FOR PEELING PRESSURE-SENSITIVE ADHESIVE OPTICAL FILM, AND PRESSURE-SENSITIVE ADHESIVE OPTICAL FILM

This application is the U.S. National Phase under 35 U.S.C §371 of International Application No. PCT/JP2009/050773, filed Jan. 20, 2009, which claims priority to the Japanese Patent Applications No. 2008-015079, filed Jan. 28, 2008, and No. 2009-009115, filed Jan. 19, 2009. The International Application was not published in English under PCT Article 21(2).

TECHNICAL FIELD

The invention relates to a method for peeling a pressure-sensitive adhesive optical film from an optical film-carrying glass substrate and to a pressure-sensitive adhesive optical film for use in the peeling method. Examples of the optical film include a polarizing plate, a retardation plate, an optical compensation film, a brightness enhancement film, a viewing angle expansion film, and a laminate of any combination thereof.

BACKGROUND ART

A liquid crystal display or the like has an image-forming mechanism in which polarizing elements are essentially placed on both sides of the liquid crystal cell, and generally, polarizing plates are attached as the polarizing elements. Besides polarizing plates, various optical elements for improving display quality are used in a liquid crystal panel. For example, there are used a retardation plate for preventing discoloration, a viewing angle expansion film for improving the viewing angle of the liquid crystal display, and a brightness enhancement film for enhancing the contrast of the display. These films are generically called optical films.

When such optical films are attached to a liquid crystal cell, a pressure-sensitive adhesive is generally used. In the process of bonding an optical film and a liquid crystal cell or optical films together, a pressure-sensitive adhesive is generally used to bond the materials together so that optical loss can be reduced. In such a case, a pressure-sensitive adhesive optical film including an optical film and a pressure-sensitive adhesive layer previously formed on one side of the optical film from a pressure-sensitive adhesive composition is generally used, because it has some advantages such as no need for a drying process to fix the optical film.

In a conventional technique, when the process of bonding a pressure-sensitive adhesive optical film to the surface of a liquid crystal cell suffers from bonding misalignment or trapping of foreign matter, which may cause a failure in liquid crystal display, the bonded pressure-sensitive adhesive optical film is peeled off and replaced with a new one, which is bonded again to the surface of the liquid crystal cell. However, as the size of liquid crystal displays increases or as the thickness of liquid crystal cells decreases, it is becoming difficult to peel off pressure-sensitive adhesive optical films. In particular, a large force is necessary to peel off a pressure-sensitive adhesive layer with a high adhesive strength, which may cause problems such as poor workability, display quality degradation due to changes in liquid crystal cell gap, and damage to the liquid crystal cell. In order to keep the manufacturing cost low, pressure-sensitive adhesive optical films are also required to be capable of being peeled off and reused and to have such reworkability that they can be peeled off with no adhesive deposit.

Methods proposed to solve the above problems include a method that includes peeling an optical film, while softening or melting the pressure-sensitive adhesive with an electrically heated wire or a heated slicer being inserted between a liquid crystal panel and the optical film (Patent Documents 1 and 2), and a method that includes making incisions in an optical film placed on a liquid crystal panel to divide the optical film into fragments and peeling off the fragments (Patent Document 3).

Another proposed method includes immersing, in an alkaline solution, a display material to which a transparent film is bonded with a pressure-sensitive adhesive interposed therebetween, and then peeling the transparent film and the pressure-sensitive adhesive from the display material (Patent Document 4).

There are further proposed a method that includes bonding a peeling sheet to the optical member to be peeled off and peeling the optical member together with the peeling sheet (Patent Document 5) and a method including bonding a pressure-sensitive adhesive tape to a polarizing plate and peeling the polarizing plate with the pressure-sensitive adhesive tape (Patent Document 6).

There are further proposed a method of removing a polarizing plate or the like from a glass substrate by immersion in concentrated sulfuric acid (Patent Document 7), a method of peeling off a polarizing plate by dissolving and removing a pressure-sensitive adhesive with a solvent such as acetone or trichloroethylene (Patent Document 8), a method of dissolving and removing a polarizing plate with a solvent capable of solubilizing the polarizing plate (Patent Document 9), and a method of peeling a pressure-sensitive adhesive optical film in the presence of a liquid at the peel interface between the substrate and the pressure-sensitive adhesive layer of the pressure-sensitive adhesive optical film (Patent Document 10).

However, these methods involve a laborious work such as insertion of a peeling tool between a liquid crystal panel and an optical film or cutting only an optical film placed on a liquid crystal panel. These methods also have a problem such as a large amount of an adhesive deposit left on the liquid crystal panel or damage to the liquid crystal panel from a solvent.

PRIOR ART DOCUMENTS

Patent Document 1: Japanese Patent Application Laid-Open (JP-A) No. 11-95210
Patent Document 2: JP-A No. 2002-350837
Patent Document 3: JP-A No. 2001-242448
Patent Document 4: JP-A No. 2001-328849
Patent Document 5: JP-A No. 2002-40259
Patent Document 6: JP-A No. 2002-159955
Patent Document 7: JP-A No. 2001-305502
Patent Document 8: JP-A No. 2001-337305
Patent Document 9: JP-A No. 2005-224715
Patent Document 10: JP-A No. 2005-148638

DISCLOSURE OF INVENTION

Objects to be Achieved by the Invention

An object of the invention is to provide a pressure-sensitive adhesive optical film-peeling method capable of easily detaching the pressure-sensitive adhesive optical film from a glass substrate with no damage to the glass substrate or no adhesive deposit on the glass substrate, and to provide a pressure-sensitive adhesive optical film suitable for use in such a peeling method.

Means for Solving the Problems

As a result of investigations to solve the above problems, the inventors have made the invention based on the finding that the peeling method described below makes it possible to achieve the object.

Thus, the invention is directed to a method for peeling a pressure-sensitive adhesive optical film from an optical film-carrying glass substrate including a glass substrate and the pressure-sensitive adhesive optical film bonded thereto, which includes:

exposing the optical film-carrying glass substrate to an environment at a temperature of 40 to 98° C. and a relative humidity of 60 to 99% for three minutes or more; and then peeling the pressure-sensitive adhesive optical film from the glass substrate under the environment.

When the optical film-carrying glass substrate is exposed to the specified environment for the specified time period (exposure process) as stated above, the adhesive strength (the stress during peeling) of the pressure-sensitive adhesive layer of the pressure-sensitive adhesive optical film can be sufficiently reduced. The process of peeling the pressure-sensitive adhesive optical film from the glass substrate under the same environment makes it possible to peel off the pressure-sensitive adhesive optical film from the glass substrate with no damage to the glass substrate or no adhesive deposit, while good reworkability is achieved. The peeling method of the invention achieves good reworkability even when a large-size liquid crystal panel is manufactured or when a thin liquid crystal cell is used. The peeling method of the invention also makes possible easy peeling with no adhesive deposit even when the pressure-sensitive adhesive optical film is attached to the glass substrate for a long time, so that the adhesive strength becomes high.

If the exposure process and the peeling process are performed at a temperature of less than 40° C. or a relative humidity of less than 60%, the elastic modulus of the pressure-sensitive adhesive layer cannot be sufficiently reduced, so that good reworkability cannot be achieved when the pressure-sensitive adhesive optical film is peeled. If the temperature is more than 98° C. or the relative humidity is more than 99%, the cohesive strength of the pressure-sensitive adhesive layer will be reduced, so that an adhesive deposit may be more likely to be formed on the glass substrate.

The pressure-sensitive adhesive layer of the pressure-sensitive adhesive optical film is preferably made from an organic solvent-based pressure-sensitive adhesive composition, so that an increase in the adhesive strength over time can be suppressed after the bonding process and that the resulting pressure-sensitive adhesive layer can have high durability.

The organic solvent-based pressure-sensitive adhesive composition preferably includes (1) 100 parts by weight of a (meth)acrylic polymer including 50% by weight or more of an alkyl (meth)acrylate monomer unit and 0.05 to 2% by weight of a hydroxyl group-containing monomer unit, (2) 0.01 to 5 parts by weight of a silane coupling agent, and (3) 0.01 to 5 parts by weight of a crosslinking agent.

When the organic solvent-based pressure-sensitive adhesive composition used has the composition described above, a pressure-sensitive adhesive layer with improved workability and durability can be obtained, and the pressure-sensitive adhesive optical film can be peeled off with no damage to the glass substrate or no adhesive deposit, while good reworkability is achieved.

The silane coupling agent is preferably an amine type silane coupling agent, and the crosslinking agent is preferably an isocyanate crosslinking agent. The addition of these components can further improve the workability, durability and reworkability.

The invention is also directed to a pressure-sensitive adhesive optical film for use in the above pressure-sensitive adhesive optical film-peeling method, which includes an optical film and a pressure-sensitive adhesive layer provided on at least one side of the optical film and which has an adhesive strength of 10 N/25 mm width or less after bonded to a glass substrate and exposed to an environment at a temperature of 40 to 98° C. and a relative humidity of 60 to 99% for three minutes or more.

When exposed to the specified environment for, the specified time period (exposure process), the pressure-sensitive adhesive optical film of the invention can have a pressure-sensitive adhesive layer whose adhesive strength (the stress during peeling) is sufficiently reduced, and can be peeled off from a glass substrate with no damage to the glass substrate or no adhesive deposit, while good reworkability is achieved. The pressure-sensitive adhesive optical film of the invention can be peeled off with good reworkability, even when a large-size liquid crystal panel is manufactured or when a thin liquid crystal cell is used.

EMBODIMENTS FOR CARRYING OUT THE INVENTION

In an embodiment of the invention, the optical film-carrying glass substrate includes a glass substrate and a pressure-sensitive adhesive optical film bonded thereto. The pressure-sensitive adhesive optical film has a pressure-sensitive adhesive layer, which is preferably, but not limited to, the layer made from an organic solvent-based pressure-sensitive adhesive composition.

Any of various organic solvent-containing, pressure-sensitive adhesive compositions such as rubber-based pressure-sensitive adhesive compositions, acrylic pressure-sensitive adhesive compositions, and silicone pressure-sensitive adhesive compositions may be used as the organic solvent-based pressure-sensitive adhesive composition. Acrylic pressure-sensitive adhesive compositions are preferred, because of their colorlessness and transparency and their good tackiness to a liquid crystal cell (glass substrate).

An organic solvent-based acrylic pressure-sensitive adhesive composition contains a (meth)acrylic polymer produced by polymerization of alkyl (meth)acrylate in the presence of a polymerization initiator. The alkyl group may be any of straight and branched chains. As used herein, the term "(meth)acrylate" means acrylate and/or methacrylate, and "(meth)" is used in the same meaning in the description.

The alkyl (meth)acrylate may have an alkyl group of 1 to about 14 carbon atoms, examples of which include methyl (meth)acrylate, ethyl (meth)acrylate, n-butyl (meth)acrylate, tert-butyl (meth)acrylate, isobutyl (meth)acrylate, n-hexyl (meth)acrylate, cyclohexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate. These may be used alone or in any combination.

In an embodiment of the invention, the alkyl (meth)acrylate is preferably used in an amount of 50% by weight or more, more preferably 55 to 99.95% by weight, based on the total amount of all monomer components for the (meth) acrylic polymer. If the amount of the alkyl (meth)acrylate is less than 50% by weight, the tackiness may be undesirably low.

When the (meth)acrylic polymer contains a hydroxyl group-containing monomer unit, the durability and the reworkability can be improved. When the (meth)acrylic polymer used contains a copolymerized hydroxyl group-containing monomer component, the copolymerized component acts to provide an acid-base interaction, a hydrogen bond or the like, so that the reworkability and the durability are improved, which results in a reduction in peeling or separation of the pressure-sensitive adhesive layer under heating or humidifying conditions.

Examples of the hydroxyl group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl acrylate, N-methylol(meth)acrylamide, N-hydroxy(meth)acrylamide, vinyl alcohol, allyl alcohol, 2-hydroxyethyl vinyl ether, 4-hydroxybutyl vinyl ether, and diethylene glycol monovinyl ether.

The hydroxyl group-containing monomer is preferably used in an amount of 0.05 to 2% by weight, more preferably 0.05 to 1.5% by weight, based on the total amount of all monomer components for the (meth)acrylic polymer. If the monomer content is less than 0.05% by weight, the durability of the pressure-sensitive adhesive layer may tend to be difficult to improve. If it is more than 2% by weight, the reworkability may tend to be low.

Examples of other polymerizable monomers that may be used as needed include cohesive strength- or heat resistance-enhancing components such as carboxyl group-containing monomers, sulfonic acid group-containing monomers, phosphoric acid group-containing monomers, cyano group-containing monomers, vinyl ester monomers, and aromatic vinyl monomers; and adhesive strength-enhancing components or components with a functional group serving as a crosslinking site, such as acid anhydride group-containing monomers, amide group-containing monomers, amino group-containing monomers, epoxy group-containing monomers, N-acryloyl morpholine, and vinyl ether monomers. These monomers may be used alone or in combination of two or more thereof.

Examples of carboxyl group-containing monomers include acrylic acid, methacrylic acid, carboxyethyl (meth) acrylate, carboxypentyl (meth)acrylate, itaconic acid, maleic acid, fumaric acid, and crotonic acid. In particular, acrylic acid and methacrylic acid are preferably used.

Examples of sulfonic acid group-containing monomers include styrenesulfonic acid, allylsulfonic acid, 2-(meth) acrylamido-2-methylpropanesulfonic acid, (meth) acrylamidopropanesulfonic acid, sulfopropyl (meth)acrylate, and (meth) acryloyloxynaphthalenesulfonic acid.

Examples of phosphoric acid group-containing monomers include 2-hydroxyethylacryloyl phosphate and mono[poly (propylene oxide)(meth)acrylate]phosphate.

Examples of cyano group-containing monomers include acrylonitrile and methacrylonitrile.

Examples of vinyl ester monomers include vinyl acetate, vinyl propionate, and vinyl laurate.

Examples of aromatic vinyl monomers include styrene, chlorostyrene, chloromethylstyrene, and α-methylstyrene.

Examples of acid anhydride group-containing monomers include maleic anhydride and itaconic anhydride.

Examples of amide group-containing monomers include acrylamide and diethylacrylamide.

Examples of amino group-containing monomers include N,N-dimethylaminoethyl (meth)acrylate, N,N-dimethylaminopropyl (meth)acrylate, N-(meth) acryloylmorpholine, and alkylaminoalkyl (meth)acrylate.

Examples of epoxy group-containing monomers include glycidyl (meth)acrylate and allyl glycidyl ether.

Examples of vinyl ether monomers include methyl vinyl ether, ethyl vinyl ether and isobutyl vinyl ether.

The (meth)acrylic polymer may have a weight average molecular weight of 500,000 or more, preferably 1,000,000 or more, more preferably 1,800,000 or more. If the weight average molecular weight is less than 500,000, the pressure-sensitive adhesive may have low cohesive strength, so that an adhesive deposit may tend to occur. The weight average molecular weight may be determined by GPC (gel permeation chromatography).

The (meth)acrylic polymer may be prepared by solution polymerization. The resulting (meth)acrylic polymer may be any of a random copolymer, a block copolymer and a graft copolymer.

In solution polymerization, ethyl acetate, toluene or the like may be used as a polymerization solvent. An example of solution polymerization includes performing the reaction under a stream of inert gas such as nitrogen in the presence of a polymerization initiator typically under the reaction conditions of a temperature of about 50 to about 70° C. and a time period of about 5 to about 30 hours.

The weight average molecular weight of the (meth)acrylic polymer may be controlled by the amount of addition of the polymerization initiator or the chain transfer agent or by the reaction conditions. The amount of the addition may be controlled as appropriate depending on the type of these materials.

Examples of the polymerization initiator include, but are not limited to, azo initiators such as 2,2'-azobisisobutyronitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamide]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

The polymerization initiators may be used alone or in combination of two or more thereof. The total content of the polymerization initiator(s) is preferably from 0.005 to 1 part by weight, more preferably from 0.02 to 0.6 parts by weight, based on 100 parts by weight of the monomer components.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. The chain transfer agents may be used alone or in combination of two or more thereof. The total content of the chain transfer agent(s) may be from about 0.01 to about 0.4 parts by weight, based on 100 parts by weight of the monomer components.

In an embodiment of the invention, the organic solvent-based acrylic pressure-sensitive adhesive composition may include the (meth)acrylic polymer as a main component and optionally a silane coupling agent and/or a crosslinking agent.

The addition of a silane coupling agent improves the durability and reworkability of the pressure-sensitive adhesive layer. Examples of the silane coupling agent include epoxy structure-containing silicon compounds such as 3-glycidoxypropyltrimethoxysilane, 3-glycidoxypropylmethyldimethoxysilane, and 2-(3,4-epoxycyclohexyl)ethyltrimethoxysilane; amino group-containing silicon compounds such as 3-aminopropyltrimethoxysilane, N-(2-aminoethyl)-3-aminopropyltrimethoxysilane, N-(2-aminoethyl)-3-aminopropylmethyldimethoxysilane, N-phenyl-3-aminopropyltrimethoxysilane, and 3-triethoxysilyl-N-(1,3-dimethylbutylidene)propylamine; 3-chloropropyltrimethoxysilane; (meth)acrylic group-containing silane coupling agents such as acetoacetyl group-containing trimethoxysilane, 3-acryloxypropyltrimethoxysilane and 3-methacryloxypropyltriethoxysilane; and isocyanate group-containing silane coupling agents such as 3-isocyanatopropyltriethoxysilane.

Among these silane coupling agents, amino group-containing silicon compounds (amine-type silane coupling agents) are preferably used. In particular, the use of a secondary amino group-containing silicon compound can suppress an increase in the adhesive strength of the pressure-sensitive adhesive layer after it is bonded to the glass substrate.

The silane coupling agent is preferably used in an amount of 0.01 to 5 parts by weight, more preferably 0.01 to 1 part by weight, based on 100 parts by weight of the (meth)acrylic polymer. If the silane coupling agent is used in an amount of less than 0.01 parts by weight, the durability of the pressure-sensitive adhesive layer may be less likely to increase. If it is more than 5 parts by weight, the adhesive strength to the glass substrate may be too high so that there may be an influence on the reworkability and so on.

The crosslinking agent includes a polyfunctional compound capable of reacting with the functional group of the (meth)acrylic polymer to form a crosslinked structure, examples of which include an organic crosslinking agent and a polyfunctional metal chelate. Examples of the organic crosslinking agent include an epoxy crosslinking agent, an isocyanate crosslinking agent, an imine crosslinking agent, an aziridine crosslinking agent, and a melamine crosslinking agent. In particular, an isocyanate crosslinking agent, which is capable of reacting with a hydroxyl group, is preferably used. The polyfunctional metal chelate may include an organic compound and a polyvalent metal that is covalently or coordinately bonded to the organic compound.

An organic peroxide may also be used as the crosslinking agent. Any organic peroxide capable of producing active radical species upon heating or photoirradiation to promote the crosslinking of the base polymer in the pressure-sensitive adhesive composition may be used. In view of workability or stability, an organic peroxide with a one-minute half-life temperature of 80° C. to 160° C. is preferably used, and an organic peroxide with a one-minute half-life temperature of 90° C. to 140° C. is more preferably used. If the one-minute half-life temperature is too low, the reaction may proceed during storage before application and drying, so that the composition may be too viscous to be applied. If the one-minute half-life temperature is too high, the crosslinking reaction temperature may be high so that a side reaction may occur or a large part of the peroxide may remain unreacted, so that the crosslinking may undesirably proceed over time.

Examples of organic peroxides include di(2-ethylhexyl) peroxydicarbonate (one-minute half-life temperature: 90.6° C.), di(4-tert-butylcyclohexyl) peroxydicarbonate (one-minute half-life temperature: 92.1° C.), di-sec-butyl peroxydicarbonate (one-minute half-life temperature: 92.4° C.), tert-butyl peroxyneodecanoate (one-minute half-life temperature: 103.5° C.), tert-hexyl peroxypivalate (one-minute half-life temperature: 109.1° C.), tert-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethyl hexanoate (one-minute half-life temperature: 124.3° C.), di(4-methylbenzoyl)peroxide (one-minute half-life temperature: 128.2° C.), dibenzoyl peroxide (one-minute half-life temperature: 130.0° C.), tert-butyl peroxyisobutylate (one-minute half-life temperature: 136.1° C.), and 1,1-di(tert-hexylperoxy)cyclohexane (one-minute half-life temperature: 149.2° C.). In particular, di(4-tert-butylcyclohexyl) peroxydicarbonate, dilauroyl peroxide and dibenzoyl peroxide are preferably used, because they can provide high crosslinking reaction efficiency.

The half life of the peroxide is an indicator of how fast the peroxide can be decomposed and refers to the time required for the remaining amount of the peroxide to reach one half of the original amount. The decomposition temperature required for a certain half life in a certain time and the half life time obtained at a certain temperature are shown in catalogs furnished by manufacturers, such as "Organic Peroxide Catalog, 9th Edition, May, 2003" furnished by NOF CORPORATION.

The crosslinking agents may be used singly or in combination of two or more thereof. The total content of the crosslinking agent(s) is preferably from 0.01 to 5 parts by weight, more preferably from 0.05 to 1 part by weight, based on 100 parts by weight of the (meth)acrylic polymer. If the crosslinking agent is used in an amount of less than 0.01 parts by weight, the durability of the pressure-sensitive adhesive layer may be less likely to increase. If it is more than 5 parts by weight, the pressure-sensitive adhesive layer may have high elastic modulus and low stress relaxing ability, which may increase the amount of curling in a liquid crystal cell.

The crosslinked pressure-sensitive adhesive layer preferably has a gel fraction of 45 to 90% by weight, more preferably 50 to 90% by weight, even more preferably 55 to 90% by weight.

The crosslinking process may be performed at the temperature where the process of drying the pressure-sensitive adhesive layer is performed, or an independent crosslinking process may be performed after the drying process. Since the characteristics of the optical film may be changed by exposure to temperature, the crosslinking process should preferably be performed before the bonding to the optical film.

Any other known additive may be further added to the organic solvent-based acrylic pressure-sensitive adhesive composition. For example, a tackifier, a plasticizer, a filler, an antioxidant, an ultraviolet absorber, or the like may be added as needed.

The pressure-sensitive adhesive optical film may include an optical film and a pressure-sensitive adhesive layer that is formed on at least one side of the optical film from the pressure-sensitive adhesive composition described above.

Examples of methods for forming the pressure-sensitive adhesive layer include a method that includes applying the organic solvent-based pressure-sensitive adhesive composition to a release-treated separator or the like, removing the organic solvent and so on by drying to form a pressure-sensitive adhesive layer, and transferring the pressure-sensitive adhesive layer onto the optical film; and a method that includes applying the organic solvent-based pressure-sensitive adhesive composition to the optical film and removing the organic solvent and so on by drying to form a pressure-sensitive adhesive layer.

Various methods may be used to form the pressure-sensitive adhesive layer, and examples include methods using a coater such as a comma coater, a fountain die coater, a lip coater, or a slot die coater.

The thickness of the pressure-sensitive adhesive layer is generally, but not limited to, from about 3 to about 500 μm, preferably from 5 to 100 μm, more preferably from 5 to 40 μm.

The optical film used to form the pressure-sensitive adhesive optical film is typically a polarizing plate. A polarizing plate including a polarizer and a transparent protective film or films provided on one or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to about 500 μm from the viewpoint of a strength, workability such as handlability, requirement for a thin film and the like. Especially, the thickness is preferably in the range of from 1 to 300 μm and more preferably in the range of from 5 to 200 μm. Therefore, it is particularly preferred that the transparent protective film has a thickness of 5 to 150 μm.

Note that in a case where the transparent protective films are provided on both sides of a polarizer, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl (meth)acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly($C_{1-6}$ alkyl (meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth)acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (I):

[Formula 1]

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth)acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin, is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has an in-plane retardation of less than 40 nm and a thickness direction retardation of less than 80 nm. The in-plane retardation Re is expressed by the formula Re=(nx−ny)×d, the thickness direction retardation Rth is expressed by the formula Rth=(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to about 150 μm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

A retardation plate satisfying the relation: nx=ny>nz, nx>ny>nz, nx>ny=nz, nx>nz>ny, nz=nx>ny, nz>nx>ny, or nz>nx=ny may be selected and used depending on various applications. The relation ny=nz includes not only the case where ny is completely equal to nz but also the case where ny is substantially equal to nz.

For example, the retardation plate satisfying the relation nx>ny>nz to be used preferably has a in-plane retardation of 40 to 100 nm, a thickness retardation of 100 to 320 nm, and an Nz coefficient of 1.8 to 4.5. For example, the retardation plate satisfying the relation nx>ny=nz (positive A plate) to be used preferably has a in-plane retardation of 100 to 200 nm. For example, the retardation plate satisfying the relation nz=nx>ny (negative A plate) to be used preferably has a in-plane retardation of 100 to 200 nm. For example, the retardation plate satisfying the relation nx>nz>ny to be used preferably has a in-plane retardation of 150 to 300 nm and an Nz coefficient of more than 0 and not more than 0.7. As described above, for example, the retardation plate satisfying the relation nx=ny>nz, nz>nx>ny or nz>nx=ny may also be used.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (positive A-plate, biaxial, negative C-plate) is preferred. In VA mode, a combination of positive A-plate and negative C-plate or single use of biaxial film is preferably used. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS (In-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, Z conversion on the upper side with no retardation on the lower side or an A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, nx>ny=nz, nx>nz>ny, nz>nx=ny, or nz>nx>ny (positive A-plate, biaxial, negative C-plate) is preferred.

The film with retardation may be separately prepared and laminated to a transparent protective film with no retardation so that the function described above can be provided.

The transparent protective film may be subjected to surface modification treatment to increase adhesion for the polarizer before it is applied with the adhesive. Specific examples of such treatment include corona treatment, plasma treatment, flame treatment, ozonation, primer treatment, glow treatment, saponification treatment, and coupling agent treatment. And an appropriate antistatic layer may be formed.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 20 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface, and preferably 5 to 50 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

The polarizer may be bonded to the transparent protective film with an adhesive. Examples of such an adhesive include isocyanate adhesives, polyvinyl alcohol adhesives, gelatin adhesives, vinyl latexes, and aqueous polyesters. The adhesive is generally used in the form of an aqueous solution, which generally has a solids content of 0.5 to 60% by weight. Besides the above, an active energy ray-curable adhesive such as an ultraviolet-curable adhesive or an electron beam-curable adhesive may also be used as the adhesive to bond the polarizer to the transparent protective film. Electron beam-curable adhesives for polarizing plates exhibit good adhesion to the transparent protective film. In the adhesive used in the present invention may contain a metal compound filler.

An optical film is especially no limitation about the optical layers, which may be used for formation of a liquid crystal display etc., such as a reflector, a transflective plate, a retardation plate (a half wavelength plate and a quarter wavelength plate included), and a viewing angle compensation film, may be used.

Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical member, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a bi-directional stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as a pressure sensitive adhesive layer, may be used for laminating. On the occasion of adhesion of the above described polarizing plate and other optical layer, the optical axis may be set as a suitable configuration angle according to the target retardation characteristics etc.

In an embodiment of the invention, the optical film-carrying glass substrate includes a glass substrate (liquid crystal cell) and a pressure-sensitive adhesive optical film bonded thereto. The pressure-sensitive adhesive optical film has a pressure-sensitive adhesive layer that may be made from an organic solvent-based pressure-sensitive adhesive composition, so that it can exhibit high tackiness immediately after it is bonded to the glass substrate and that it can exhibit high durability even under a high-temperature and/or high-humidity atmosphere.

The method of the invention for peeling a pressure-sensitive adhesive optical film is characterized by including exposing the optical film-carrying glass substrate to an environment at a temperature of 40 to 98° C. and a relative humidity of 60 to 99% for three minutes or more and then peeling the pressure-sensitive adhesive optical film from the glass substrate under the environment.

Even when the pressure-sensitive adhesive optical film is attached to the glass substrate for a long time, so that the adhesive strength reaches 20 N/25 mm width or more, the exposure to the environment in the peeling method of the invention can reduce the adhesive strength to 10 N/25 mm width or less. According to the peeling method of the invention, therefore, the pressure-sensitive adhesive optical film can be easily peeled off even from a large-size glass substrate, while good reworkability is achieved. The exposure process is preferably performed under the conditions of a temperature of 50 to 98° C. and a relative humidity of 60 to 99%.

The exposure process is preferably performed for a time period of 3 to 60 minutes, more preferably 5 to 30 minutes. If the time period is less than three minutes, the adhesive strength (the stress during peeling) of the pressure-sensitive adhesive layer cannot be sufficiently reduced, so that the glass substrate may be damaged during peeling or an adhesive deposit may be considerably formed, which may reduce the reworkability. A time period of more than 60 minutes is not preferred in view of production efficiency.

The exposure process and the peeling process may be performed in a thermo-hygrostat or by blowing heated and humidified air. Alternatively, the exposure process may be performed in a thermo-hygrostat, and the peeling process may be performed while heated and humidified air is blown.

EXAMPLES

The invention is more specifically described by the examples below, which are not intended to limit the scope of the invention. In each example, parts and % are all by weight. The evaluation items in the examples and so on were measured as described below.

Gel Fraction

About 0.1 g of the pressure-sensitive adhesive layer immediately after crosslinking was sampled, and its weight ($W_1$) was measured. The sample was then wrapped in a microporous polytetrafluoroethylene film (film weight: $W_2$) and immersed in about 50 ml of ethyl acetate at 23° C. for 2 days so that the soluble part was extracted. The pressure-sensitive adhesive layer was then taken out together with the film. They are dried at 120° C. for 2 hours and measured for total weight ($W_3$). The gel fraction (%) of the pressure-sensitive adhesive layer was determined from the measured values according to the formula below. After the coating process, the pressure-sensitive adhesive layer was stored at room temperature for 1 week (aging) and then measured for gel fraction.

$$\text{Gel fraction (\%)} = \{(W_3 - W_2)/W_1\} \times 100$$

Durability (Humidification Test and Heat Resistance Test)

The pressure-sensitive adhesive polarizing plate prepared was cut into a piece of 320 mm×240 mm. The cut piece was bonded to a 0.7 mm thick non-alkali glass plate (#1737 manufactured by Corning Incorporated) and autoclaved under 0.5 Mpa at 50° C. for 15 minutes. Thereafter, the cut piece was allowed to stand at 60° C. and 90% RH (humidification test) or at 80° C. (heat resistance test) for 500 hours. The state of the sample was visually evaluated according to the following criteria.

○ (good): Neither peeling nor separation was observed in the polarizing plate.
x (poor): Peeling or separation was observed in the polarizing plate.

Production Example 1

Synthesis of Acrylic Polymer

To a four-neck flask equipped with a stirring blade, a thermometer, a nitrogen gas introducing tube, and a condenser were added 100 parts of butyl acrylate, 1 part of 4-hydroxybutyl acrylate, 5 parts of acrylic acid, 0.1 parts of 2,2'-azobisisobutyronitrile as a polymerization initiator (manufactured by Wako Pure Chemical Industries, Ltd.), and 200 parts of ethyl acetate as a polymerization solvent. After the air was sufficiently replaced with nitrogen, the mixture was subjected to a polymerization reaction at about 60° C. for 9 hours with stirring under a nitrogen stream, so that an acrylic polymer A1 solution was prepared.

Preparation of Organic Solvent-Based Acrylic Pressure-Sensitive Adhesive Composition Based on 100 parts of the solids of the acrylic polymer A1 solution, 0.1 parts of N-phenyl-3-aminopropyltrimethoxysilane as a silane coupling agent (KBM573 manufactured by Shin-Etsu Chemical Co., Ltd.), 0.2 parts of dibenzoyl peroxide (manufactured by Wako Pure Chemical Industries, Ltd.) and 0.05 parts of hexamethylene diisocyanate adduct of trimethylolpropane (D-160N manufactured by Mitsui Takeda Chemicals, Inc.) were added to the acrylic polymer A1 solution and uniformly mixed and stirred, so that an organic solvent-based acrylic pressure-sensitive adhesive composition A2 was obtained.

Preparation of Pressure-Sensitive Adhesive Polarizing Plate

The organic solvent-based acrylic pressure-sensitive adhesive composition A2 was applied to one side of a silicone-treated polyethylene terephthalate film (38 μm in thickness, manufactured by TORAY INDUSTRIES, INC.) and heated at 130° C. for 3 minutes (according to calculation, about 88% of the peroxide was decomposed), so that a pressure-sensitive adhesive layer was formed, which had a thickness of 20 μm after drying. The pressure-sensitive adhesive layer had a gel fraction of 65% immediately after drying and a gel fraction of 77% after aging. The pressure-sensitive adhesive layer was then transferred to the surface of a polarizing plate, so that a pressure-sensitive adhesive polarizing plate A3 was prepared. As a result of each of the humidification test and the heat resistance test, the pressure-sensitive adhesive polarizing plate A3 was evaluated to be ○ (good).

Preparation of Polarizing Plate-Carrying Glass Substrate

The pressure-sensitive adhesive polarizing plate A3 was press-bonded to a glass substrate (Corning #1737 manufactured by Corning Incorporated) by one reciprocation of a 2 kg roller. Subsequently, the product was autoclaved under 0.5 MPa at 50° C. for 15 minutes and then cooled to 25° C., so that a polarizing plate-carrying glass substrate A4 was obtained.

Production Example 2

Synthesis of Acrylic Polymer

To a four-neck flask equipped with a stirring blade, a thermometer, a nitrogen gas introducing tube, and a condenser were added 100 parts of butyl acrylate, 1 part of 4-hydroxybutyl acrylate, 0.1 parts of 2,2'-azobisisobutyronitrile as a polymerization initiator (manufactured by Wako Pure Chemical Industries, Ltd.), and 200 parts of ethyl acetate as a polymerization solvent. After the air was sufficiently replaced with nitrogen, the mixture was subjected to a polymerization reaction at about 60° C. for 9 hours with stirring under a nitrogen stream, so that an acrylic polymer B1 solution was prepared.

Preparation of Organic Solvent-Based Acrylic Pressure-Sensitive Adhesive Composition Based on 100 parts of the solids of the acrylic polymer B1 solution, 0.1 parts of N-phenyl-3-aminopropyltrimethoxysilane as a silane coupling agent (KBM573 manufactured by Shin-Etsu Chemical Co., Ltd.), 0.2 parts of dibenzoyl peroxide (manufactured by Wako Pure Chemical Industries, Ltd.) and 0.05 parts of hexamethylene diisocyanate adduct of trimethylolpropane (D-160N manufactured by Mitsui Takeda Chemicals, Inc.) were added to the acrylic polymer B1 solution and uniformly mixed and stirred, so that an organic solvent-based acrylic pressure-sensitive adhesive composition B2 was obtained.

Preparation of Pressure-Sensitive Adhesive Polarizing Plate

The organic solvent-based acrylic pressure-sensitive adhesive composition B2 was applied to one side of a silicone-treated polyethylene terephthalate film (38 μm in thickness, manufactured by TORAY INDUSTRIES, INC.) and heated at 130° C. for 3 minutes (according to calculation, about 88% of the peroxide was decomposed), so that a pressure-sensitive adhesive layer was formed, which had a thickness of 20 μm after drying. The pressure-sensitive adhesive layer had a gel fraction of 52% immediately after drying and a gel fraction of 68% after aging. The pressure-sensitive adhesive layer was then transferred to the surface of a polarizing plate, so that a pressure-sensitive adhesive polarizing plate B3 was prepared.

As a result of each of the humidification test and the heat resistance test, the pressure-sensitive adhesive polarizing plate B3 was evaluated to be ○ (good).

Preparation of Polarizing Plate-Carrying Glass Substrate

The pressure-sensitive adhesive polarizing plate B3 was press-bonded to a glass substrate (Corning #1737 manufactured by Corning Incorporated) by one reciprocation of a 2 kg roller. Subsequently, the product was autoclaved under 0.5 MPa at 50° C. for 15 minutes and then cooled to 25° C., so that a polarizing plate-carrying glass substrate B4 was obtained.

Example 1

The polarizing plate-carrying glass substrate A4 was allowed to stand in a thermo-hygrostat at a temperature of 60° C. and a relative humidity of 90% for 15 minutes. The pressure-sensitive adhesive polarizing plate was then peeled from a corner of the glass substrate under the same environment. As a result of visual observation, no adhesive deposit was observed at all on the surface of the glass substrate.

Example 2

The polarizing plate-carrying glass substrate A4 was allowed to stand in a thermo-hygrostat at a temperature of 80° C. and a relative humidity of 92% for 5 minutes. The pressure-sensitive adhesive polarizing plate was then peeled from a corner of the glass substrate under the same environment. As a result of visual observation, no adhesive deposit was observed at all on the surface of the glass substrate.

Example 3

The polarizing plate-carrying glass substrate A4 was allowed to stand in a thermo-hygrostat at a temperature of 60° C. and a relative humidity of 90% for 5 minutes. The pressure-sensitive adhesive polarizing plate was then peeled from a corner of the glass substrate, while water vapor at a temperature of 80° C. and a relative humidity of 92% was sprayed between the pressure-sensitive adhesive polarizing plate and the glass substrate. As a result of visual observation, no adhesive deposit was observed at all on the surface of the glass substrate.

Example 4

The polarizing plate-carrying glass substrate A4 was allowed to stand in a thermo-hygrostat at a temperature of 50° C. and a relative humidity of 90% for 15 minutes. The pressure-sensitive adhesive polarizing plate was then peeled from a corner of the glass substrate under the same environment. As a result of visual observation, no adhesive deposit was observed at all on the surface of the glass substrate.

Example 5

The polarizing plate-carrying glass substrate B4 was allowed to stand in a thermo-hygrostat at a temperature of 60° C. and a relative humidity of 90% for 15 minutes. The pressure-sensitive adhesive polarizing plate was then peeled from a corner of the glass substrate under the same environment. As a result of visual observation, no adhesive deposit was observed at all on the surface of the glass substrate.

Comparative Example 1

The polarizing plate-carrying glass substrate A4 was allowed to stand in a thermo-hygrostat at a temperature of 23° C. and a relative humidity of 50% for 15 minutes. It was tried to peel the pressure-sensitive adhesive polarizing plate from a corner of the glass substrate under the same environment, but the polarizing plate was cracked in the course of peeling, and it was not able to completely peel off the pressure-sensitive adhesive polarizing plate.

Comparative Example 2

The polarizing plate-carrying glass substrate A4 was allowed to stand in a thermo-hygrostat at a temperature of 80° C. and a relative humidity of 5% for 15 minutes. The pressure-sensitive adhesive polarizing plate was then peeled from a corner of the glass substrate under the same environment. As a result of visual observation, a large amount of an adhesive deposit was observed on the surface of the glass substrate.

The invention claimed is:

1. A method for peeling a pressure-sensitive adhesive optical film from an optical film-carrying glass substrate comprising a glass substrate and the pressure-sensitive adhesive optical film bonded thereto, comprising:

exposing the optical film-carrying glass substrate to an environment at a temperature of 40 to 98° C. and a relative humidity of 60 to 99% for three minutes or more, wherein, subsequent to said three minutes or more, the pressure-sensitive adhesive optical film is bonded to the glass substrate with an adhesive strength of 10 N/25 mm width or less, and wherein, prior to said three minutes or more, the pressure-sensitive adhesive optical film is bonded to the glass substrate with an adhesive strength of 20 N/25 mm width or more; and then peeling the pressure-sensitive adhesive optical film from the glass substrate under the environment, wherein the pressure-sensitive adhesive optical film has a pressure-sensitive adhesive layer made from an organic solvent-based pressure-sensitive adhesive composition comprising:

(1) 100 parts by weight of a (meth)acrylic polymer comprising 50% by weight or more of an alkyl (meth) acrylate monomer unit and 0.05 to 2% by weight of a hydroxyl group-containing monomer unit;

(2) 0.01 to 5 parts by weight of a silane coupling agent; and (3) 0.01 to 5 parts by weight of a crosslinking agent.

2. The method according to claim 1, wherein the silane coupling agent is an amine type silane coupling agent.

3. The method according to claim 2, wherein the crosslinking agent is an isocyanate crosslinking agent.

4. The method according to claim 1, wherein the crosslinking agent is an isocyanate crosslinking agent.

5. The method according to claim 1, wherein the weight average molecular weight of the (meth)acrylic polymer is 500,000 or more.

6. The method according to claim 1, wherein the pressure-sensitive adhesive layer is crosslinked and has a gel fraction of 45 to 90% by weight.

7. The method according to claim 1, wherein the optical film comprises a polarizer.

8. The method according to claim 7, wherein the optical film comprises a transparent protective film.

9. The method according to claim 1, wherein said exposing and peeling are performed in a thermo-hygrostat.

10. The method according to claim 1, wherein said peeling is performed while heated and humidified air is blown.

* * * * *